(No Model.)
O. A. THAYER.
STEERING ATTACHMENT FOR SLEDS.
No. 344,146. Patented June 22, 1886.
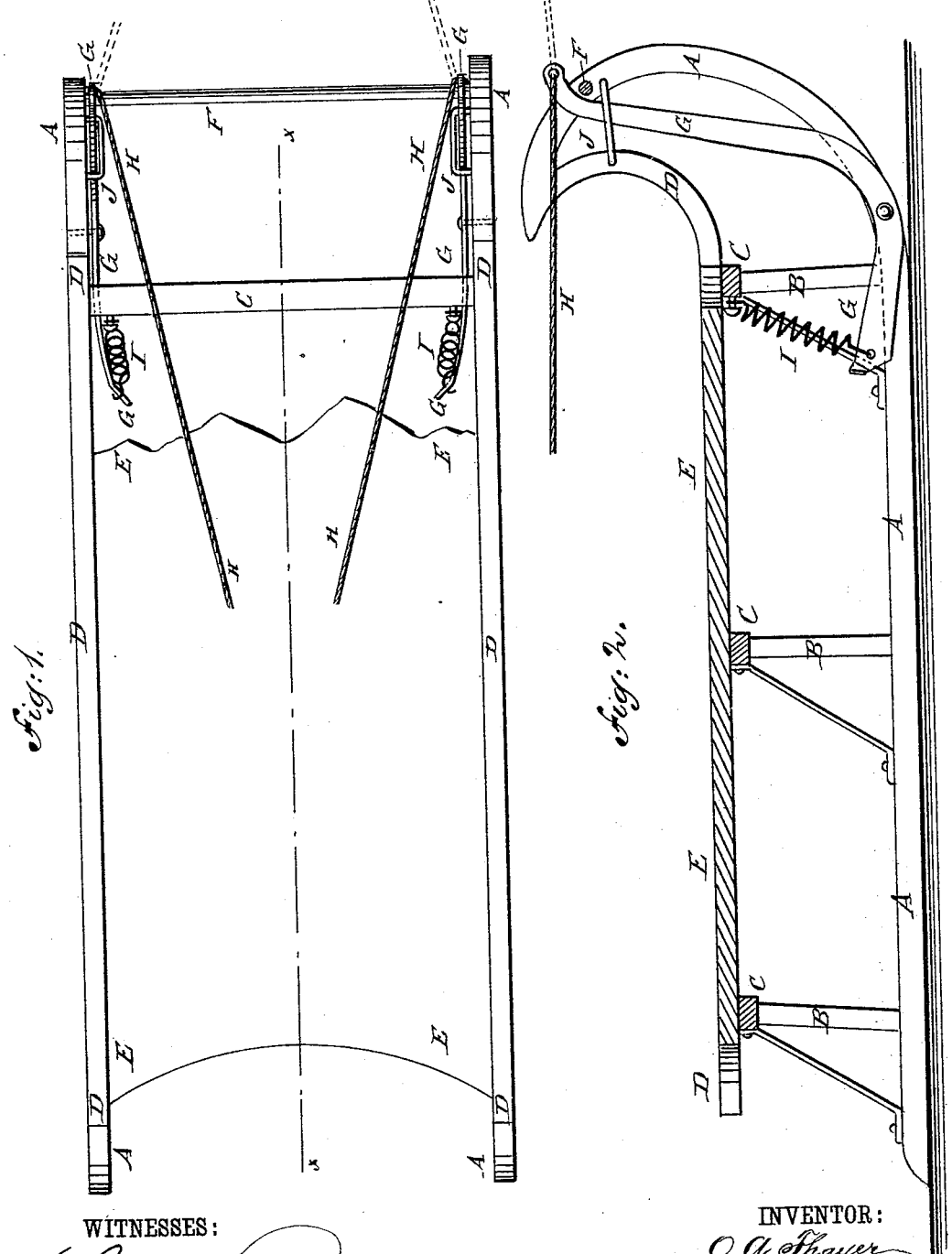
WITNESSES:
Chas. Nida
C. Sedgwick
INVENTOR:
O. A. Thayer
BY Munn & Co.
ATTORNEYS.

UNITED STATES PATENT OFFICE.

ORLANDO A. THAYER, OF PARIS, MAINE.

STEERING ATTACHMENT FOR SLEDS.

SPECIFICATION forming part of Letters Patent No. 344,146, dated June 22, 1886.

Application filed August 27, 1885. Serial No. 175,458. (No model.)

*To all whom it may concern:*

Be it known that I, ORLANDO A. THAYER, of Paris, in the county of Oxford and State of Maine, have invented certain new and useful Improvements in Steering Attachments for Sleds, of which the following is a full, clear, and exact description.

Reference is to be had to the accompanying drawings, forming part of this specification, in which similar letters of reference indicate corresponding parts in both the figures.

Figure 1 is a plan view of my improvement, shown as applied to a sled. Fig. 2 is a sectional side elevation of the same, taken through the line $x$ $x$, Fig. 1.

The object of this invention is to provide improved steering attachments for sleds, by the use of which the sleds can be easily and reliably guided.

The invention consists in the construction of the attachment, and in its combination with the runners of the sled, as will be hereinafter fully described and claimed.

A represents the runners, B the knees, C the beams, D the raves, and E the bottom, of an ordinary sled.

F is the round to which the draft is usually applied, and which is attached to the upper forward parts of the runners A.

To the forward parts of the runners A, a little above the beginning of their upward bends, are pivoted by bolts or rivets steering-bars G, the forward parts of which are bent upward, so as to pass up at the rear side of the draft-round F, and to their upper ends are attached the ends of cords H.

The rear parts of the steering-bars G are curved inward slightly, as shown in Fig. 1, and to their rear ends are attached the lower ends of spiral springs I, the upper ends of which are attached to the forward beam C, as shown in Figs. 1 and 2, so that the rear parts of the bars G, when the said bars are left free, will be raised out of contact with the snow or ice.

The upper parts of the steering-bars G are kept in place against the sides of the runners A, and their movements are limited by keepers J, attached at their forward ends to the said runners and at their rear ends to the raves D, as shown in Fig. 2, and through which the upper ends of the said bars pass.

With this construction, when the upper end of one of the steering-bars G is drawn to the rearward by pulling upon its cord H, the lower part of the said bar G will be brought into contact with the snow or ice, and will at once turn the sled toward that side, the inward curve of the said lower bar making it very sensitive, so that only a slight contact with the snow or ice will be needed to guide the sled, and the sled can be steered without having its speed lessened. The cords H can also be used as draw-ropes, the draft-strain being sustained by the round F, against the rear side of which the upper parts of the steering-bars G rest when the said steering-bars are in their normal position.

Having thus described my invention, what I claim as new, and desire to secure by Letters Patent, is—

1. The combination, with a sleigh, of curved steering-bars pivoted to the inside of the runners thereof, and having their lower ends bent inward and their upper ends projecting above and in rear of the draft-round of the sleigh, a cord attached to the upper ends of said bars, and springs attached to their lower ends and to the sleigh, substantially as herein shown and described.

2. The combination, with the sleigh A B C D E F, of the curved steering-bars G, pivoted to the inside of the runners A, and having their lower ends bent inward and their upper ends projecting above and in rear of the draft-bar F, the rope H, attached to the upper ends of said bars, the keepers J, attached to the runners and raves, and the springs J, attached to the beams C, and the steering-bars G, substantially as herein shown and described.

ORLANDO A. THAYER.

Witnesses:
ALBERT S. AUSTIN,
HERRICK C. DAVIS.